Patented July 30, 1940

2,209,905

UNITED STATES PATENT OFFICE 2,209,905

WEED KILLING COMPOSITION

Anderson W. Ralston and Robert J. Vander Wal, Chicago, Ill., assignors to Armour and Company, Chicago, Ill., a corporation of Illinois No Drawing. Application February 13, 1939, Serial No. 256,202

8 Claims. (Cl. 167—45)

This invention relates to weed killing compositions, and it comprises a weed killing composition containing, as an active ingredient, a mercurated petroleum distillate or fraction.

The extermination of weeds such as dandelions, thistles, and other milk- or latex-containing weeds has been a long standing problem. Generally the products hitherto suggested have been inorganic chemicals such as potassium chlorate, sodium arsenate, ferric chloride, etc. Although most of these compounds are effective to dry up the plant none of them, unless used in large quantities, affect the root system of the weed to such an extent that it cannot regenerate. The most serious objection to the use of materials of this nature for weed control in lawns is the fact that they destroy the grass. Since in most cases it is desirable to retain the grass the use of these chemicals for weed control in lawns is not indicated. The problem so far as the control of weeds in lawns is concerned is to find treatments which control and eliminate the weed growth without damage to the grass.

In order to permanently destroy weed growth in the presence of grass without injury to the grass it is necessary to treat the areas with substances which are preferentially absorbed by the weed roots. The action must be upon the root systems since it is only by destroying such systems that the weeds are permanently removed. We have set ourselves to the solution of this problem and many substances have been investigated.

We have now discovered that mercurated petroleum distillates or fractions are effective herbicides and that they possess specific affinity for the weed roots in the presence of grass. In some cases the grass may be browned by treatment with our herbicides, but in no case have the grass roots been injured. The weeds on the other hand are destroyed due to the complete disintegration of their root systems. We attribute this difference both to the specific differences in constitution of the various root systems and also to the much greater porosity of the weed root system compared to the grass roots. In any event we have been able to demonstrate that when areas containing both weeds and grass are treated with mercurated petroleum products the weed root system is destroyed and the presence of mercury in the weed root system can be demonstrated, whereas the grass roots are not injured and contain no mercury.

The mercurated petroleum distillates or fractions can be prepared readily by reacting a mercuric salt, such as the chloride, acetate, cyanide or nitrate, with ordinary petroleum hydrocarbon mixtures customarily distilled from petroleum oil. Any of the usual distillates or fractions, such as the light oils, gasoline, kerosene, fuel oil, and even the lubricating oil fractions can be used as the petroleum starting material. Such hydrocarbon mixtures can consist essentially of aliphatic hydrocarbons, or they can contain aromatic base hydrocarbons as well. The latter occur in fractions and distillates prepared from naphthenic and Mid-Continent base oils.

The petroleum distillate can be reacted with the mercuric salt alone, or with a mixture of the mercuric salt and a lower aliphatic alcohol, such as methyl, ethyl, propyl or butyl. Water can be substituted for the alcohol, but the reaction takes longer.

When a mercuric salt alone is reacted with the distillate, the mercury thereof probably substitutes for a ring hydrogen of the aromatic hydrocarbons in the distillate. When alcohol or water is also present in the reaction mixture, the mercury probably combines with the olefinic hydrocarbons in the distillate. But in either case the course of the reaction is not clearly understood. We content ourselves with noting that the mercurated distillate contains combined mercury, usually in about 0.5% to 5%, and that such mercurated products are useful as herbicides. The percentage of combined mercury depends in part upon the amount of mercuric salt used, and in part on the kind of hydrocarbons in the distillate.

Our herbicides are advantageously prepared for use by dissolving the mercurated distillate in a petroleum hydrocarbon or other vehicle to give a spraying liquid. We can mix the mercurated compound with inert powders, such as talc or pumice to give a dusting powder also. Emulsions may also be prepared.

The following examples illustrate the preparation of mercurated petroleum distillates or fractions which we can use, although we do not wish to be limited to the compounds specifically described.

Example 1

A petroleum distillate designated as light straw distillate is mercurated. This distillate has the following constants: A. P. I. gravity at 60° F.—36.9; flash (closed cup) 154° F.; fire 195° F.; color—1½ N. P. A.; iodine number 10.9; boiling point—initial, 408° F., 50% at 443° F., and 502° F.

500 grams of this straw distillate is mixed with 500 cc. of dry methyl alcohol and 70 grams of mercuric acetate. The mixture is stirred and refluxed for six and one-half hours, and then allowed to stand overnight. The mixture stratifies into two layers which are separated in the usual way. The lower layer is diluted with water and an oil settles to the bottom. The oil is separated off and mixed with the upper, or hydrocarbon layer of the reaction mixture, in which it is soluble. The resulting solution is washed with water and filtered. The filtrate is a straw colored liquid weighing 430 grams, and having a mercury content of 4.09%. This filtrate is then diluted with sufficient unreacted straw distillate to give a solution having a mercury content of 0.2% and the diluted solution used as a spray on weed-infected grass areas. Our experiments show that when the solution is sprayed in the proportion of about one gallon of liquid to 200 square feet of area the weeds begin to die in twenty-four hours, and in a week they disappear completely. The grass frequently turns brown during this period but soon regains its healthy appearance.

Example 2

Five hundred grams of a white distillate having the following constant: A. P. I. gravity at 60° F.—41.0; flash (closed cup) 165° F.; color—water white; iodine number 6; boiling point—initial, 386° F., 50% at 468° F., final 558° F., are mixed with 500 cc. of dry methyl alcohol and 32 grams of mercuric acetate. The mixture is refluxed for ten hours with constant stirring and then allowed to stand overnight to permit stratification into two layers. The hydrocarbon upper layer has a mercury content of 2.56%. This layer is then diluted with additional white distillate to give a solution suitable for spraying containing 0.2% of mercury. Test sprayings on lawns show it to be as effective a weed killer as the product described under Example 1.

Example 3

A fuel oil designated as a No. 1 fuel oil is mercurated. This distillate has the following constants: A. P. I. gravity at 60° F.—38.9; flash (closed cup)—155° F.; color (Saybolt)—9; sulfur—0.13%; iodine number 10.8; boiling point—initial, 365° F., 50% at 421° F., final 510° F. 500 grams of this oil are mixed with 500 cc. of ethyl alcohol and 64 grams of mercuric chloride. The mixture is refluxed with constant stirring for ten hours and then allowed to stratify. The hydrocarbon layer is separated, washed and dried. Analysis shows it to contain 3.81% of mercury. This layer is then diluted with sufficient No. 1 fuel oil to give a product having a mercury content of 0.2%. Test sprayings show the product to be an efficient selective weed killer.

Example 4

A petroleum distillate designated as No. 9 refined oil is mercurated. The distillate prior to mercuration has the following constants: A. P. I. gravity at 60° F.—46.6; flash (closed cup)—155° F.; color (Saybolt)—26; sulfur—0.021%; iodine number 8.6; boiling point—initial, 372° F., 50% at 425° F., final 494° F. 500 grams of the distillate are mixed with 60 grams of mercuric acetate and 500 grams of dry methyl alcohol. The mixture is refluxed with constant stirring for ten hours. It is then allowed to stand overnight and stratify; water is added to the lower alcohol layer and the upper hydrocarbon layer separated. The upper layer contains 0.53% of mercury. This is then diluted with more of the No. 9 refined oil until the mixture has a mercury content of 0.2%. Spraying tests demonstrate the final solution to be an effective selective weed killer.

Example 5

Fifty grams of the light straw distillate described in Example 1 are heated on an oil bath with 10 grams of mercuric acetate. The mercuric acetate is added to the straw distillate at a temperature of 130–42° C. over a period of 25 minutes. After the addition, the mixture is heated with stirring for 15 minutes at 130° C. The excess mercuric acetate is then filtered away from the mercurated distillate and the reaction product is washed with water until the water washings give no mercury test. Analysis of the product shows that it contains 1.07% mercury. It is a liquid which can be further diluted with the same distillate or another distillate to give a spraying solution of the desired mercury content.

Example 6

Fifty grams of the white distillate described under Example 2 are reacted with 10 grams of mercuric acetate. The mercuric acetate is added over a period of 20 minutes at 130–8° C. with constant stirring. The mixture is then heated for ½ hour at 133–136° C. It is then filtered and washed with water as described in Example 5. The washed oil contains 1.43% mercury.

Example 7

Fifty grams of the fuel oil described under Example 3 are treated with 10 grams of mercuric acetate. The time of addition is 20 minutes at a temperature of 130–38° C. Heating is then continued at approximately 135° C. for ½ hour. The product is filtered and washed as previously described. This gives a liquid product containing 0.68% of mercury.

We have found that the weed killers above described are specific for the removal of weeds having milk- or latex-containing roots, such as those belonging to the family of Compositae which includes thistles, dandelions, sunflowers; or those belonging to the family of Asclepiadaceae which includes milkweeds. They are especially effective in the control of weeds belonging to the genus Plantago which includes the common plantain weed. They are also useful in the control and eradication of the so-called "crab grass" which is a serious lawn pest. As above stated, all of these weeds have very absorptive root systems and we attribute the selective killing action of our compounds largely to this fact.

In our experimental work control plots were sprayed using the same concentration of ordinary petroleum distillate. In none of these cases was any selective killing observed and we are thus able to demonstrate clearly that the weed eradication observed is due to the mercurated distillate and not to the distillate itself.

While we have shown in our examples the preparation and use of several representative distillates and their reaction with several mercuric salts, any petroleum distillate can be used. Favorable results are obtained with distillates ranging from gasolines to and including lubricating oils or greases. We further realize that our mercurated products can be applied effectively in ways other than those which we have described. Thus, in some cases, it may be advantageous to spray them as emulsions, and in other cases it may be desirable to soak them up in inert ingredients such as sawdust, pumice, etc., and scatter these products over the lawn areas. We also do not wish to be limited to the specific concentrations which we have employed since these will depend largely upon the conditions of the tests and other factors such as the relative proportions of weeds to grass.

Having thus described our invention, what we claim is:

1. A weed killing composition containing as an active constituent the product of reacting a petroleum fraction or distillate with a mercuric salt.

2. A weed killing composition containing as an active constituent the product of reacting a petroleum fraction or distillate with a mercuric salt in the presence of an alcohol.

3. A weed killing composition comprising a hydrocarbon solution of a mercurated petroleum distillate or fraction.

4. A weed killing composition comprising a hydrocarbon solution of the product of reacting a petroleum distillate or fraction with a mercuric salt.

5. A weed killing composition comprising a hydrocarbon solution of the product of reacting a petroleum distillate or fraction with a mercuric salt and an alcohol.

6. A weed killing composition comprising a mercurated petroleum distillate or fraction in a liquid vehicle therefor.

7. A weed killing composition comprising a liquid spraying vehicle containing the product of reacting a petroleum distillate or fraction with a mercuric salt.

8. A weed killing composition comprising a liquid spraying vehicle containing the product of reacting a petroleum distillate or fraction with mercuric salt and an alcohol.

ANDERSON W. RALSTON.
ROBERT J. VANDER WAL.